A. O. COX AND P. SAGER.
CULTIVATOR.
APPLICATION FILED JULY 22, 1919.

1,352,783.

Patented Sept. 14, 1920.
2 SHEETS—SHEET 1.

INVENTORS
A. O. COX and
P. SAGER,
BY *Strong & Townsend*
ATTORNEYS

A. O. COX AND P. SAGER.
CULTIVATOR.
APPLICATION FILED JULY 22, 1919.

1,352,783.

Patented Sept. 14, 1920.
2 SHEETS—SHEET 2.

INVENTORS
A. O. COX and
P. SAGER

BY Strong & Townsend.
ATTORNEYS

UNITED STATES PATENT OFFICE.

ARTHUR O. COX AND PETER SAGER, OF WATSONVILLE, CALIFORNIA.

CULTIVATOR.

1,352,783.                    Specification of Letters Patent.    Patented Sept. 14, 1920.

Application filed July 22, 1919.   Serial No. 312,528.

*To all whom it may concern:*

Be it known that we, ARTHUR O. COX and PETER SAGER, both citizens of the United States, residing at Watsonville, in the county of Santa Cruz and State of California, have invented new and useful Improvements in Cultivators, of which the following is a specification.

This invention relates to a cultivator and especially to a draft connection and a coöperating mechanism for raising and lowering the front end of the cultivator frame.

One of the objects of the present invention is to provide a cultivator which employs a main V-shaped frame, a pair of wheels supporting the rear end of the frame, crank axles for raising and lowering the rear end of the frame to adjust the depth of the cutters or to raise them entirely out of the ground and in conjunction therewith a draft connection which permits the pull exerted to be applied direct to the main frame.

Another object of the invention is to provide means operable in conjunction with the draft connection for raising and lowering the front end of the main frame, and further, to provide means for operating said front raising and lowering mechanism independently of the crank axles.

Further objects will hereinafter appear.

The invention consists of the parts and the construction, combination and arrangement of parts as hereinafter more fully described and claimed, having reference to the accompanying drawings, in which—

Figure 1:
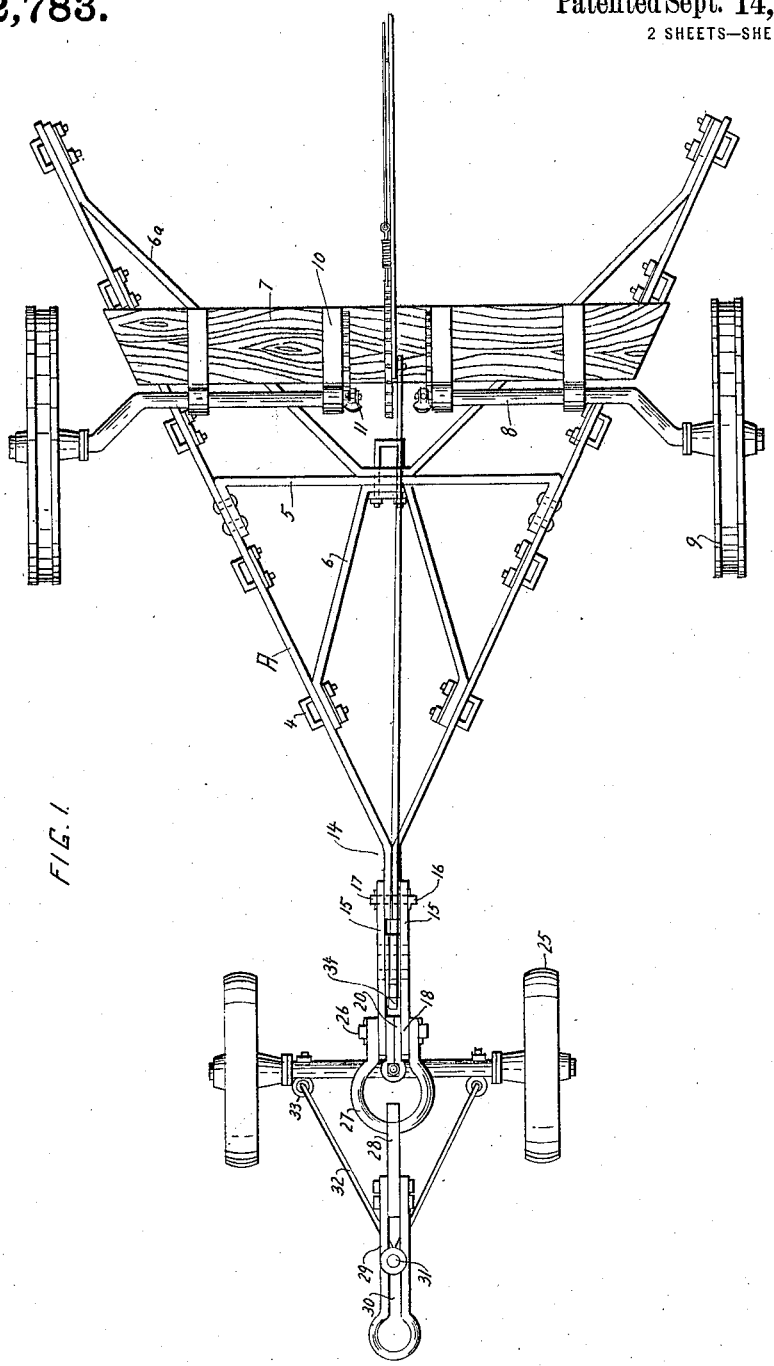
Figure 1 is a plan view of the cultivator.

Referring to the drawings in detail, A indicates the main frame of the cultivator, to which is secured a plurality of shank members 2, on the lower ends of which are secured in the usual manner cutters or teeth 3. The upper ends of the teeth supporting shanks 2 are secured to the main frame by means of U-bolts 4 and are therefore to a certain extent vertically adjustable with relation to the frame. The frame A is V-shaped in construction and is laterally braced by a cross bar 5 and angle bars 6 and 6ª, said last-named angle bars serving as a support for a platform 7 and a pair of crank axles 8, on the outer ends of which are journaled a pair of main supporting wheels 9. The crank axles 8 are journaled in bearing brackets 10 secured to the platform 7 and they may be turned in said journal brackets to raise and lower the rear end of the main frame by means of a pair of levers 11, there being one lever for each crank axle, to permit independent adjustment of each. The crank levers 11 are secured to the inner ends of the crank axles and each lever is provided with a pawl 12 which engages with a toothed rack 13 to permit locking of the levers and the crank axles in any position desired. The structure of the cultivator so far described, contains no novelty. The real invention involved resides in the front end construction but as the operation of the cultivator depends upon the entire mechanism, a brief description of the rear end construction is submitted.

The forward end of the main V-shaped frame terminates in a pair of parallel bars which are riveted together as shown at 14. These bars pass between a pair of interspaced arms 15 and are pivotally secured between the rear ends of said arms as at 16, by merely passing a bolt 17 through perforations formed in the arms 15 and the bars forming the forward end of the main frame. The forward ends of the arms 15 are turned downwardly as shown at 18 and are rigidly secured by rivets 19 to a king plate 20, through which extends a king bolt 21. The king bolt 21 is forked at its lower end as at 22 and an axle 23 is pivotally secured in the forked end of the king bolt by means of a pin 24. This axle serves as a support for a pair of front wheels 25 but it does at no time connect with the draft connection nor is any of the strain or pull exerted, transmitted to the axle, its only function being that of steering the cultivator and supporting the forward end of the main frame.

Passing through the king plate 20 and the downwardly turned ends 18 of the arms 15 is a pin 26 and pivotally mounted on said pin is a shackle ring 27 to which is pivotally connected, as at 28, a draw bar 29. The forward end of the draw bar consists of two parallel arms, between which is secured an eye bolt such as indicated at 28. This eye bolt forms a pivotal connection between the shackle ring 27 and the draw bar and it therefore permits the pull, when exerted, to be transmitted directly from the main frame through the shackle ring 27 to the draw bar 29. Spacing apart of the draw bar arms, as shown in Fig. 1, forms a slot or a guideway 30, in which is slidably mounted a block 31, this block being connected with the axle 23 by means of a pair of draw bar links 32 which are pivotally connected with the axle by means of eye bolt connections 33. Secured between the arms 15, just forwardly of the pivotal connections 16, is an upwardly extending arm 34. Pivotally mounted on the platform 7 is a lever 35 and forming a connection between said lever and the upper end of the arm 34 is a link 36. Mounted on the lever 35 is a grip actuated pawl 37 and arranged on one side of the lever is a segmental-shaped toothed rack 38 with which the pawl is adapted to engage to lock the lever against movement.

Figure 2:
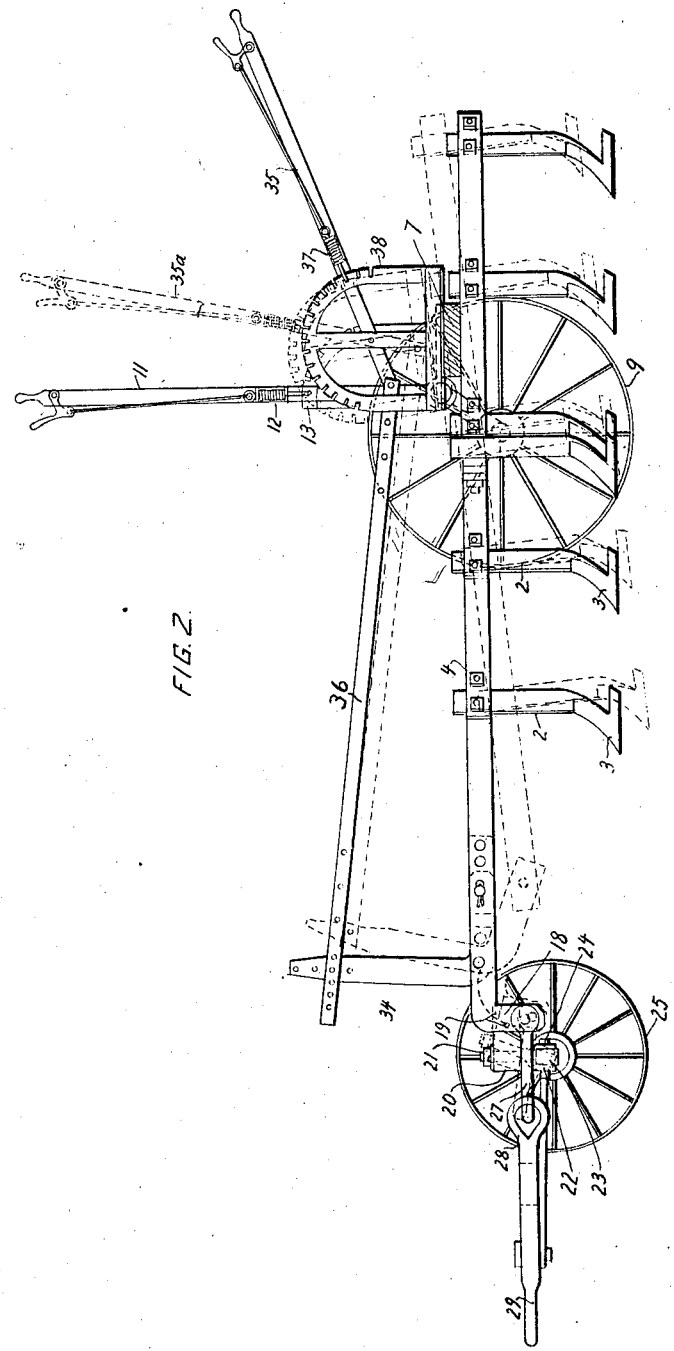
Fig. 2 is a side elevation of the same.

The lever 35 is provided for the purpose of raising and lowering the forward end of the main frame, said raising and lowering operation being permitted by providing the pivotal connection 16 between the forward end of the main frame and the arms 15. For instance, if lever 35 is swung from the position shown in Fig. 2, to the dotted line position shown in 35ª, then it can readily be seen that arm 34 will swing rearwardly while the arms 15, together with the king plate 20, bolt 21, and axle 23, will turn downwardly into the dotted line position shown, thus lowering the forward end of the main frame to a point where the teeth 3 will enter the ground. Further, that rearward movement of lever 35 to the full line position shown will straighten out the arms 15 and cause the same to assume a parallel position with the main frame, thus raising the main frame to the full line position shown or to a point where the teeth will clear the ground. By regulating the forward movement of the lever 35 it is possible to lower the forward end of the main frame to any point desired thereby regulating the depth to which the cutters 3 will enter the ground. Lowering of the rear end of the cultivator is obtained by turning the crank axles 8 by means of their levers 11, adjustment being obtained in this instance also by limiting the movement of the levers 11 and locking the same with relation to their racks when the desired adjustment has been secured.

From the foregoing description, it should be obvious that the forward end of the main frame may be raised or lowered independently of the rear end. This is of great importance when it comes to practical operation as raising of one end at the time permits easy operation and adjustment of the cultivator while adjustments heretofore employed which raises and lowers the entire frame in one operation, are exceedingly difficult to operate, due to the great weight imposed upon the levers, the weight being in this instance divided between three sets of levers which may be independently operated, thereby only lifting a portion of the load or weight with each lever.

Again, by referring to Figs. 1 and 2, it can be seen that the front axle is free to permit lateral movement with relation to any uneven surfaces encountered, due to the fork-shaped construction of the king pin. Further, that the pull exerted when the cultivator is in operation, is transmitted direct to the main frame through the arms 15 and not through the axle 23, thus leaving this free of all load and strain except such as is imposed by the weight of the front end of the frame. The wheels 25 can therefore easily swing from side to side and furthermore will have no tendency to dig or bury themselves when in operation.

While the main parts forming the forward end of the cultivator here shown are constructed of strap iron, we wish it understood that any suitable material or construction may be resorted to within the scope of the appended claims; similarly that the materials and the finish of the other parts employed may be such as the experience and judgment of the manufacturer may dictate.

Having thus described our invention, what we claim and desire to secure by Letters Patent are—

1. The combination with the main frame of a cultivator, of a pair of wheels supporting the rear end of the frame, a pair of wheels supporting the front end of the frame, means for raising or lowering the rear end of the frame with relation to the rear wheels, an axle supporting the front wheels, a king bolt in which the axle is pivotally mounted to permit rocking movement of the axle, a plate in which the king bolt is supported, an arm rigidly secured to said plate, a pivotal connection between said arm and the front end of the main frame, and means for raising and lowering the arm.

2. The combination with the main frame of a cultivator, of a pair of wheels supporting the rear end of the frame, a pair of wheels supporting the front end of the frame, means for raising or lowering the rear end of the frame with relation to the rear wheels, an axle supporting the front wheels, a king bolt in which the axle is pivotally mounted, to permit rocking movement of the axle, a plate in which the king bolt is supported, an arm rigidly secured to said plate, a pivotal connection between said arm and the front end of the main frame, means for raising and lowering the arm, and means for locking the arm against movement.

3. The combination with the main frame of a cultivator, of a pair of wheels supporting the rear end of the frame, a pair of wheels supporting the front end of the frame, means for raising or lowering the rear end of the frame with relation to the rear wheels, an axle supporting the front wheels, a king bolt in which the axle is pivotally mounted, a plate in which the king bolt is supported, an arm rigidly secured to said plate, a pivotal connection between said arm and the front end of the main frame, means for raising and lowering the arm, a shackle ring pivotally secured to the arm, a draw bar connected with the shackle, and steering rods connecting the axle ends with the draw bar.

4. The combination with the front end of the main frame of a cultivator, of a pair of front wheels adapted to support the same, an axle upon which said wheels are turnably mounted, a plate, a king bolt turnably mounted on the plate, a fork shaped member on the lower end of the king bolt through which the axle extends and a pin extending through the fork shaped extension and the axle to permit rocking movement of the axle.

5. The combination with the main frame of a cultivator, of a pair of wheels supporting the rear end of the frame, a pair of wheels supporting the front end of the frame, means for raising or lowering the rear end of the frame with relation to the rear wheels, an axle upon which the front wheels are turnably mounted, a plate, a king bolt turnably mounted on the plate, a fork-shaped member on the lower end of the king bolt through which the axle extends, a pin extending through the fork-shaped extension and the axle, an arm rigidly secured to the plate, a pivotal connection between the arm and the front of the main frame, a second arm extending upwardly from the first-named arm, a lever pivotally mounted on the main frame, a grip actuated pawl on the lever, a rock bar with which said pawl is engageable, and a link connection between the second named arm and the lever.

6. The combination with the main frame of a cultivator of a pair of wheels supporting the rear end of the frame, means for raising or lowering the rear ends of the frame with relation to the rear wheels, an axle and a pair of wheels supporting the front end of such frame, a plate, a king bolt turnably mounted on the plate, a fork-shaped member on the lower end of the king bolt through which the axle extends, a pin extending through the fork-shaped extension and the axle, an arm rigidly secured to the plate, a pivotal connection between the arm and the front end of the main frame, a second arm extending upwardly from the first-named arm, a lever pivotally mounted on the main frame, a grip actuated pawl on the lever, a rock bar with which said pawl is engageable, a link connection between the second named arm and the lever, a shackle ring pivotally attached to the first named arm, a draw-bar connected with the shackle, such draw-bar having a longitudinally disposed slot formed therein, a sliding block in said slot, and a pair of links connecting said block with the axle ends.

In testimony whereof we have hereunto set our hands in the presence of two subscribing witnesses.

ARTHUR O. COX.
PETER SAGER.

Witnesses:
L. S. ALEXANDER,
H. GEHRING.